(12) United States Patent
Davies et al.

(10) Patent No.: US 8,230,572 B2
(45) Date of Patent: Jul. 31, 2012

(54) METHODS AND SYSTEMS FOR CREATING ASSEMBLIES

(76) Inventors: Matthew A. Davies, Charlotte, NC (US); Kevin Scott Smith, Huntersville, NC (US)

( * ) Notice: Subject to any disclaimer, the term of this patent is extended or adjusted under 35 U.S.C. 154(b) by 8 days.

(21) Appl. No.: 12/852,972

(22) Filed: Aug. 9, 2010

(65) Prior Publication Data

US 2010/0299907 A1 Dec. 2, 2010

Related U.S. Application Data

(62) Division of application No. 10/806,603, filed on Mar. 23, 2004, now Pat. No. 7,770,278.

(60) Provisional application No. 60/456,412, filed on Mar. 24, 2003.

(51) Int. Cl.
*B23P 11/02* (2006.01)

(52) U.S. Cl. .......................................... 29/447

(58) Field of Classification Search ..................... 29/447, 29/446, 448, 426.1
See application file for complete search history.

(56) References Cited

U.S. PATENT DOCUMENTS

| | | | |
|---|---|---|---|
| 2,787,956 A * | 4/1957 | Kirby et al. ................... | 101/375 |
| 3,854,184 A | 12/1974 | Katz | |
| 5,516,042 A | 5/1996 | Gerstengerger | |
| 6,179,047 B1 | 1/2001 | Tustaniwskyj et al. | |
| 6,565,291 B2 | 5/2003 | Harpaz et al. | |
| 6,588,083 B2 | 7/2003 | Voss et al. | |
| 6,590,739 B2 | 7/2003 | Ng et al. | |
| 6,595,528 B2 | 7/2003 | Voss | |

FOREIGN PATENT DOCUMENTS

JP 410275545 10/1998

OTHER PUBLICATIONS

Prosecution History of US Patent No. 7,770,278 (U.S. Appl. No. 10/806,603) including all references cited therein.
Schunk, Celsio—Heat Shrinking Technology, Mar. 2004.
Schunk, Tendo—Hydraulic Toolholders, Mar. 1, 2004.

* cited by examiner

*Primary Examiner* — John C Hong
(74) *Attorney, Agent, or Firm* — Leak & Schroeder, PLLC; T. Benjamin Schroeder; Frank W. Leak

(57) ABSTRACT

Systems and methods for creating assemblies are described. One method described comprises providing a first element at a first temperature, providing a second element at a second temperature lower than the first temperature, coupling the first and second elements to create an assembly, and changing the first temperature to a third temperature, thereby preloading and interlocking the assembly. The first element comprises a first dimension at the first temperature. The second element comprises a second dimension lesser than the first dimension at the second temperature. The first element comprises a third dimension at the third temperature lesser than the first dimension.

14 Claims, 6 Drawing Sheets

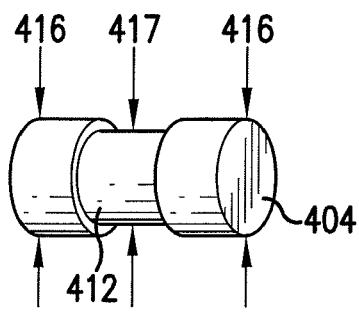
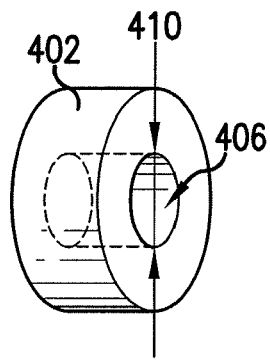
FIG.13  FIG.14
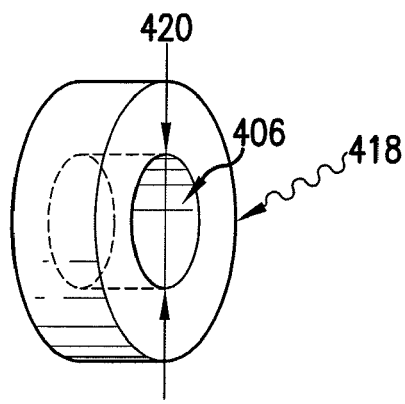
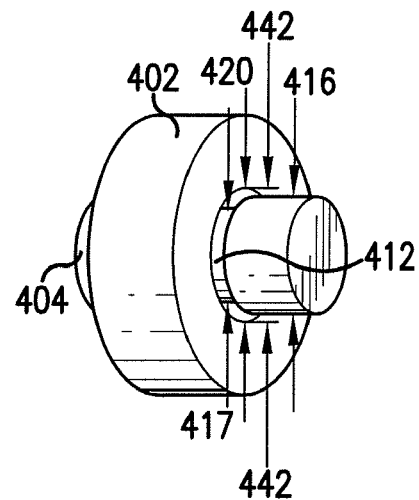
FIG.15  FIG.16
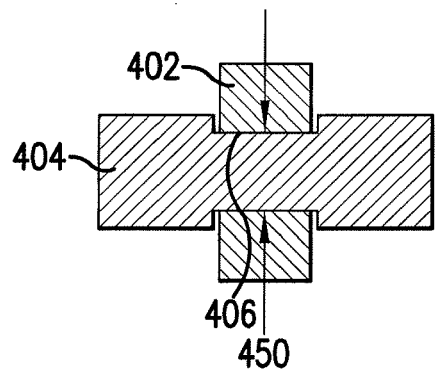
FIG.17

METHODS AND SYSTEMS FOR CREATING ASSEMBLIES

RELATED APPLICATIONS

This application is a divisional application under 35 U.S.C. §120 of U.S. patent application Ser. No. 10/806,603, filed Mar. 23, 2004, entitled "Methods and Systems for Creating Assemblies" and claims the benefit under 35 U.S.C. §119(e) of U.S. Provisional Application No. 60/456,412, filed Mar. 24, 2003, entitled "Thermally Activated Snap Fit and Interlock Connections." The entire contents of U.S. patent application Ser. No. 10/806,603 and U.S. Provisional Application No. 60/456,412 are incorporated by reference herein in their entireties.

FIELD OF THE INVENTION

The invention relates generally to methods and systems for creating assemblies. It also relates generally to the field of engineered structures.

BACKGROUND

Snap-together coupling of elements is used extensively in the conventional fabrication of plastic assemblies in which elastic and dynamic performance requirements may not be high. In conventional snap-together couplings, there are design clearances that allow elements to be coupled. The required design clearances in such conventional snap-fit couplings may create rattles and movement in the coupled assembly, and may prevent the creation of strong couplings.

Shrink-fit couplings are used in engineering practice to fasten metal elements together. Shrink-fitting is generally accomplished by first elevating the temperature of one element to increase its physical dimensions, then fitting a second element inside the first, and finally cooling the assembly to shrink the first element. The second element becomes bound by friction inside the first. This type of conventional technique is used in a variety of mechanical systems, including gear and propeller placement on shafts, and in toolholders for machine tools. Shrink fitting is normally a permanent method by which to couple elements, and is therefore usually not reversible.

There exists a need for a method to couple elements to create strong assemblies with no or minimal play or clearance between the elements, yet using a minimal amount of time, effort, and energy to perform the coupling.

SUMMARY OF THE INVENTION

The invention provides products and processes for creating assemblies. In one embodiment, a first element comprising an initial dimension is heated to a first temperature sufficient to expand the initial dimension to a first dimension. The first element is then coupled with a second element comprising a second dimension at a second temperature. The second dimension is greater than the initial dimension and lesser than the first dimension. The coupled first and second elements create an assembly. The coupled first element is cooled to a third temperature. Upon cooling, the first dimension of the first element is prevented from contracting to the initial dimension by the presence of the second element. The first element comprises a third dimension at the third temperature. The first and/or second elements are subjected to deformation, preloading and interlocking the coupled assembly.

Embodiments of the present invention provide various advantages. For example, in an embodiment, a preloaded and interlocked assembly eliminates clearances normally required by a snap-fit coupling, allowing for a stronger assembly with properties approaching those of a monolithic structure. Embodiments of the present invention allow for non-labor-intensive couplings to be made, reducing the assembly costs required to create strong assemblies that perform under demanding dynamic conditions.

These exemplary embodiments are mentioned not to limit the invention, but to provide examples of embodiments of the invention to aid understanding. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

FIG. 13 is a schematic drawing of a second element of a fourth embodiment of the present invention.

FIG. 14 is a schematic drawing of a first element of the fourth embodiment of the present invention at an initial temperature.

FIG. 15 is a schematic drawing of the first element of the fourth embodiment at an elevated first temperature.

FIG. 16 is a schematic drawing of the first and second elements of the fourth embodiment of the present invention immediately after coupling.

FIG. 17 is a cross-sectional view of the coupled first and second elements of the fourth embodiment of the present invention after part 402 has cooled to a third temperature.

DETAILED DESCRIPTION OF THE INVENTION

Figure 1:
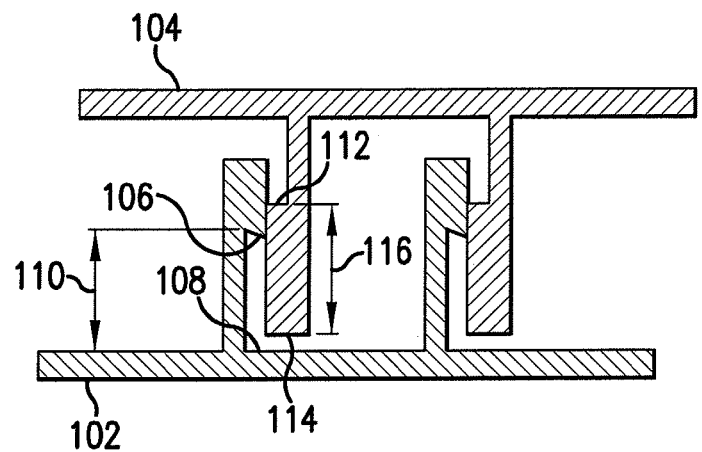
FIG. 1 is a schematic drawing of a first embodiment of the present invention at an initial equilibrium temperature.

Embodiments of the present invention include products and processes for coupling elements to create an assembly. Various methods in accordance with the present invention may be carried out. For example, the methods may be implemented in one embodiment by providing a first element at a first temperature and a second element at a lower second temperature. The first element comprises a first dimension at the first temperature, and the second element comprises a lesser second dimension at the second temperature. The first and second elements are coupled to create an assembly.

In one such embodiment, the first temperature is then changed to a third temperature, whereupon the first dimension contracts as a function of the first element's coefficient of thermal expansion until it mechanically interferes with the second element, eliminates any clearance between the first and second elements. The first element comprises a third dimension at the third temperature. In one embodiment, the second temperature is changed to a fourth temperature, the second element comprising a fourth dimension at the fourth temperature. The third and fourth dimensions may be substantially equal, and either or both of the first and second elements may be deformed where they contact each other, preloading and interlocking the coupled assembly. In one such embodiment, the third and fourth dimensions are substantially equal when the third and fourth temperatures are substantially equal.

In one embodiment, the second temperature is substantially maintained when the first and second elements are coupled. In another such embodiment, the first and second temperatures are both substantially maintained when the first and second elements are coupled to create the assembly.

Only one of the two elements to be coupled need be substantially changed in temperature, though both may be substantially changed if desired. In one embodiment, the second temperature remains substantially unchanged. In this embodiment, the first element is heated from an initial temperature to a first temperature, coupled with the second element at the second temperature, and then allowed to cool to a third temperature, while the second element maintains substantially the same temperature. In another such embodiment, only the second element substantially changes in temperature. The first and third temperatures of the first element are substantially equal, and after coupling with the second element, the first element maintains substantially the same temperature, while the second element warms from the second to the fourth temperature.

The first element may comprise a first protrusion and a second protrusion in certain embodiments of the present invention. The second element in these embodiments may comprise a first and a second end, each adapted to contact the first and second protrusions, respectively. A distance between the first protrusion and the second protrusion of the first element may comprise the first dimension at the first temperature, and the third dimension at the third temperature. A distance between the first and second ends of the second element may comprise the second dimension at the second temperature and the fourth dimension at the fourth temperature.

The first and second protrusions of the first element may be substantially parallel or oblique to each other. Likewise, the first and second ends of the second element may be substantially parallel to one another, or may be substantially oblique.

The first protrusion of the first element may be substantially parallel or substantially oblique to the first end of the second element when the first and second elements are coupled. Likewise, the second protrusion of the first element may be substantially parallel or substantially oblique to the second end of the second element when the first and second elements are coupled.

The first element may further comprise a flexible beam. The first protrusion of the first element may be located at a free end of the beam, and the second protrusion may create a base for the fixed end of the beam. In one such embodiment, the beam is adapted to allow coupling of the first and second elements by bendably flexing to permit the first protrusion to avoid the second element until the first and second elements are fully coupled and the first protrusion is adjacent the first end of the second element.

The first and/or second elements may be fashioned from any material with a suitable coefficient of thermal expansion. For example, either or both elements may comprise a metal with a coefficient of thermal expansion in a range between approximately 10 micrometers per degree Celsius per meter and approximately 25 micrometers per degree Celsius per meter. For instance, both elements may be fashioned from aluminum. Either or both elements may also comprise a polymer with a coefficient of thermal expansion in a range between approximately 0 micrometers per degree Celsius per meter and approximately 1000 micrometers per degree Celsius per meter. Many such polymers have tunable coefficients of thermal expansion, allowing a wide variety of coefficients of thermal expansion to be achieved by varying the composition or type of the polymer.

In certain embodiments, the first element may comprise a coefficient of thermal expansion different than that of the second element. In such embodiments, the coupled elements may be heated or cooled to the same temperature, but expand or contract differently due to their differing coefficients of thermal expansion. The second element may also comprise an insulating coating adapted to allow differential heating of the first and the second elements. In such an embodiment, the first and second elements may be fashioned from the same material, but the coupled elements may be differentially heated, as the insulating coating of the second element prevents the second element from absorbing as much heat energy as the uninsulated first element.

The present invention may be utilized to disassemble coupled elements. One such method comprises heating a first element comprising an initial dimension that is part of an assembly to a first temperature. The first temperature is sufficient to expand the initial dimension to a larger first dimension. The first element may be removed from the assembly when the first element reaches the first temperature. In one such embodiment, the first element may only be removed when it is at the first temperature.

In this way, the invention may be used to mechanically encrypt an assembly. In the case of a mechanically-encrypted assembly, the first element may only be removed from the assembly after being heated to a first temperature in a particular manner, location or sequence of locations. In one such mechanically-encrypted embodiment, the manner, location or sequence of heating required to remove the first element from the assembly is not readily apparent from the appearance of the assembly. The coefficient of thermal expansion of the first element in one such embodiment may comprise a first value different than the coefficient of thermal expansion of the assembly, which comprises a second value.

The invention may be embodied in one method by heating a first element comprising an initial dimension to a first temperature. The first temperature is sufficient to expand the initial dimension to a greater first dimension. The first element at the first temperature may be coupled with a second element at a second temperature to create an assembly. The second temperature is cooler than the first temperature. The second element comprises a second dimension at the second temperature. The second dimension is greater than the initial dimension, and lesser than the first dimension. The first element may be cooled to a third temperature. The third temperature is lower than the first temperature, and sufficient to contract the first dimension to a lesser third dimension, preloading and interlocking the assembly.

The invention may be embodied in an alternate method by cooling a second element comprising an initial dimension, to a second temperature. The second temperature is lower than the initial temperature, and sufficient to contract the initial dimension to a second, lesser dimension. The method further comprises maintaining a first element comprising a first dimension at a first temperature, warmer than the second temperature. The first dimension is lesser than the initial dimension of the second element, but greater than the second dimension. The first element at the first temperature and the second element at the second temperature may be coupled to create an assembly. The coupled second element is warmed to a fourth temperature. The fourth temperature is warmer than the second temperature, and the second dimension increases as a function of the coefficient of thermal expansion of the second element to a fourth dimension. The fourth dimension is greater than the second dimension, and contacts the first element, interlocking the assembly. The first and second elements are sufficiently deformed where they meet to preload the assembly.

One embodiment of the present invention is a system for coupling elements comprising a means for warming a first element comprising an initial dimension to a first temperature sufficient to expand the initial dimension to a first dimension. The system also comprises a means for coupling the first element with a second element comprising a second dimension greater than the initial dimension and lesser than the first dimension to create an assembly. The system also comprises a means for cooling the first element to a third temperature. The third temperature is cooler than the first temperature, and is sufficiently cool to preload and interlock the assembly by causing the first dimension to contract.

In one such system, the means for heating the first element may comprise a container of hot liquid. Other means for heating the first element include a heating torch; an induction heating oven; a radiator; a heating pad; a remote heating device, or series thereof, that may be controlled by a computer or manually; or any other suitable means for increasing the temperature of the first element to the first temperature.

The means for coupling the first and second elements may comprise any means for directing the first and second elements toward each other. Such means include a conveyor belt, a hydraulic ram, a compressed air tool, a gravity-powered ramp or chute, a vice, or any other suitable means for coupling the first and second elements to create an assembly.

The means for cooling the first element to the third temperature in one such system may comprise an airspace at a typical room temperature of 72 degrees Fahrenheit. Other means for cooling the first element to the third temperature include a fan, a refrigerator, an ice chest, a container of cold liquid, or any other suitable means for cooling the coupled assembly to the third temperature.

The present invention may also be embodied in an alternate system for coupling elements. This system comprises a means for cooling a second element comprising an initial dimension to a second temperature sufficient to contract the initial dimension to a second dimension. The second dimension is lesser than the initial dimension, and lesser than a first dimension of a first element. The system also comprises a means for coupling the second element with the first element to create an assembly. The system further comprises a means for warming the second element to a fourth temperature. The fourth temperature is warmer than the second temperature, and is sufficient to expand the second element to a fourth dimension. The fourth dimension is greater than both the first and second dimensions. The expansion of the first element preloads and interlocks the coupled assembly.

In one such system, the means for cooling the second element to the second temperature may comprise an airspace at a typical room temperature of 72 degrees Fahrenheit. Other means for cooling the second element to the second temperature include a fan, a refrigerator, an ice chest, a container of cold liquid, or any other suitable means for cooling the first element to the first temperature.

The means for coupling the cooled second element with the first element to create the assembly may comprise may comprise any means for directing the first and second elements toward each other. Such means include a conveyor belt, a hydraulic ram, a compressed air tool, a gravity-powered ramp or chute, a vice, or any other suitable means for coupling the first and second elements to create an assembly.

The means for warming the second element to the fourth temperature in one such system may comprise a container of hot liquid. Other means for warming the second element include a heating torch; an induction heating oven; a radiator; a heating pad; a remote heating device, or series thereof, that may be controlled by a computer or manually; or any other suitable means for increasing the temperature of assembly to the fourth temperature.

The invention may be embodied in a thermal snap-fit, collet-pin fastener. In one such embodiment, the first element may comprise a collet pin adapted to be received by a second element comprising a tube. The collet pin first element may be heated to a first temperature, and coupled with a second element by insertion into the second element tube at the second temperature. The collet pin first element may then be cooled to a third temperature, whereby it contracts as a function of its thermal coefficient of expansion until it contacts the second element, now at a fourth temperature. The resulting mechanical interference preloads and interlocks the coupled fastener.

Referring now to FIG. 1, a drawing of two elements to be coupled according to an embodiment of the present invention is shown. The first element 102 is to be coupled with the second element 104 to create an assembly. In the present exemplary embodiment, first element 102 and second element 104 are fabricated from aluminum having a coefficient of thermal expansion in the range of approximately 21 to approximately 25 micrometers per degree Celsius per meter using computer numerical controlled machines with the ability to reliably and repeatably generate complex creations in metal with tolerances of less than approximately 25 micrometers. In alternative embodiments of the present invention, other materials and methods of fabrication may be used to fabricate first and second elements 102 and 104. For instance, they could be composed of a polymer, a steel, or any other material with a suitable coefficient of thermal expansion. Elements may be fabricated by casting, molding, forging, milling, or other methods. Preferably, such methods are capable of repeatably generating complex creations with tolerances on the order of approximately 25 micrometers.

In the present exemplary embodiment, first element 102 has a first protrusion 106 and a second protrusion 108 that define a space of an initial dimension 110. The second element 104 has a first end 112 and a second end 114 that define a space of a second dimension 116. The second dimension 116 is greater than the initial dimension 110, and when the first element 102 is at an initial temperature and the second element 104 is at a second temperature equal to the initial temperature. Accordingly, first and second elements 102 and 104 may not be coupled to create an assembly due to mechanical interference.

Figure 2:
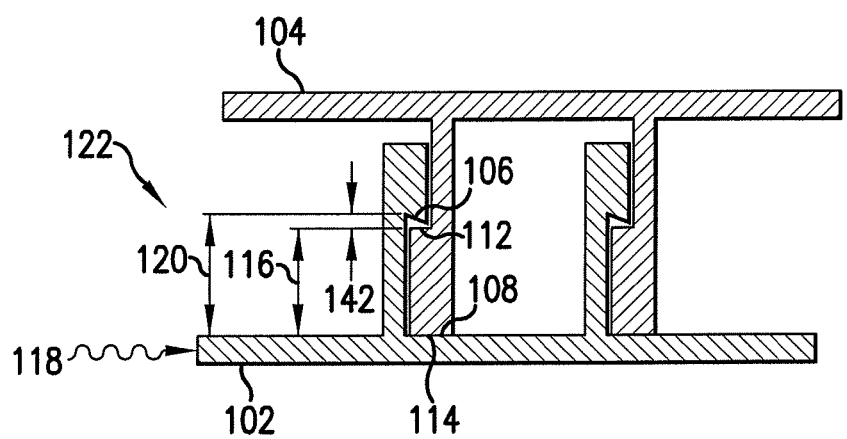
FIG. 2 is a schematic drawing of the first embodiment of the present invention after part 102 has been heated to a first temperature.

Referring now to FIG. 2, the first element 102 and second element 104 are shown in a process of being coupled according to the present invention. The first element 102 has been non-uniformly heated using a heat source 118 to a first temperature. The first temperature is warmer than the initial temperature. The first temperature is sufficient to expand former initial dimension 110 to a first dimension 120. First dimension 120 is greater than second dimension 116, forming a clearance 142. The clearance 142 allows first element 102 to couple with second element 104 to create an assembly 122. The non-uniformly heated first element 102 is directed toward second element 104 until first protrusion 106 is adjacent to first end 112 and second protrusion 108 is adjacent to second end 114, creating assembly 122. In alternative embodiments of the present invention, other means for coupling the elements 102, 104 may be used, including a conveyor belt, a hydraulic ram, a compressed air tool, a gravity-powered ramp or chute, and a vice.

Figure 3:
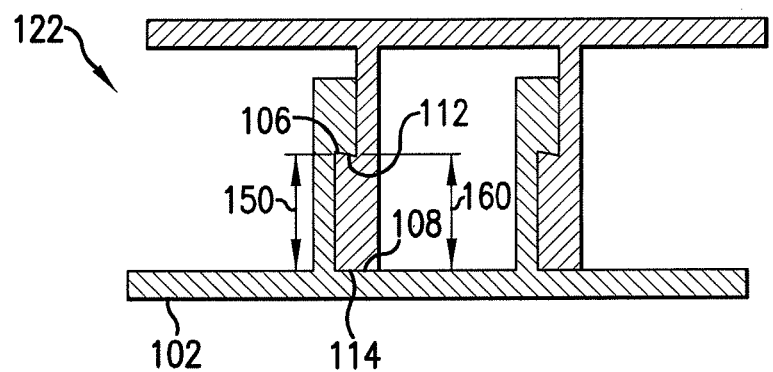
FIG. 3 is a schematic drawing of the first embodiment of the present invention after part 102 has cooled to a third temperature.

Referring now to FIG. 3, elements 102 and 104 are shown after the first temperature of the element 102 has been changed to a third temperature. The third temperature is cooler than the first temperature. In the present exemplary embodiment, upon first element 102's cooling to the third temperature, first dimension 120 has contracted to third dimension 150. Third dimension 150 is lesser than first dimension 120. The second temperature of the second element 104 has changed to a fourth temperature. In the embodiment shown, the fourth temperature is substantially equal to both the second and third temperatures. In other embodiments, the fourth temperature is substantially unequal to the second and third temperatures. The second element 104 comprises a fourth dimension 160 at the fourth temperature. In the embodiment shown, the fourth dimension 160 is substantially equal to the third dimension 150, preloading and interlocking the assembly 122. In the embodiment shown, there is no clearance between the first and second elements 102, 104.

First protrusion 106 contacts first end 112, while second protrusion 108 contacts second end 114, causing mechanical interference, interlocking the assembly 122. Because of the mechanical interference caused by the contraction of first element 102 upon cooling from the first temperature to the third temperature, third dimension 150 cannot contract any further towards its initial dimension 110 than fourth dimension 160 without causing deformation of first element 102 and/or second element 104. Thus, in the present exemplary embodiment, first element's 102 cooling to the third temperature, the assembly 122 is preloaded and interlocked, and there is no clearance or play between first element 102 and second element 104. In other embodiments, assemblies created according to the present method may be interlocked but not preloaded.

As shown in FIG. 3, in the present exemplary embodiment, once first element 102 has cooled to the third temperature, there is no clearance between the first protrusion 106 and the first end 112, nor is there any clearance between the second protrusion 108 and the second end 114. The assembly 122, composed of coupled first element 102 and second element 104 will therefore behave similar to a monolithic structure with a similar shape to the assembly 122. In a different embodiment, the assembly 122 may comprise a clearance between the first protrusion 106 and the first end 112, and/or between the second protrusion 108 and the second end 114, so that the first and second elements 102, 104 may be moved with respect to one another while coupled to create an interlocked assembly 122.

In an alternative embodiment of the present invention, the second element 104 is cooled from an initial temperature to a lower second temperature. The second temperature is lesser than the first temperature of the first element 102. The second element 104 is then coupled with the first element 102. At the second temperature, the second dimension 116 of the second element 104 is lesser than the first dimension 120 of the first element 102 at the first temperature, facilitating the coupling of first element 102 and second element 104 to create the assembly 122.

In another alternative embodiment, the second element 104 may be changed to a second temperature lower than the initial temperature without heating the first element 102. In this embodiment, the first temperature is substantially equal to the initial temperature, and the first dimension 120 is substantially equal to the initial dimension 110. The second element 104 is cooled to a second temperature low enough such that the second dimension 116 decreases as a function of the second element 104's thermal coefficient of expansion to a dimension lesser than the initial dimension 110 of the first element 102 at the initial temperature. Once the assembly 122 has been created by coupling the first element 102 and the second element 104, the second temperature of the second element 104 is changed to a fourth temperature. The fourth temperature is warmer than the second temperature, and the second dimension 116 increases to a greater fourth dimension 160.

In this alternative embodiment, the first temperature of the first element 102 is changed to a third temperature. In this embodiment, the third temperature is substantially equal to both the initial and first temperatures of the first element 102. The first element 102 comprises a third dimension 150 at the third temperature. In this alternative embodiment, the third dimension 150 is substantially equal to the fourth dimension 160 of the second element 104. At the fourth temperature, the second element's 104 first end 112 contacts first protrusion 106 and the second end 114 contacts the second protrusion 108. The first element 102 and/or the second element 104 deform, leaving the assembly 122 in a preloaded and interlocked state, with no clearance or play between first element 102 and second element 104. In another embodiment, the assembly 122 comprises a clearance between the first and second elements 102, 104.

Figure 4:
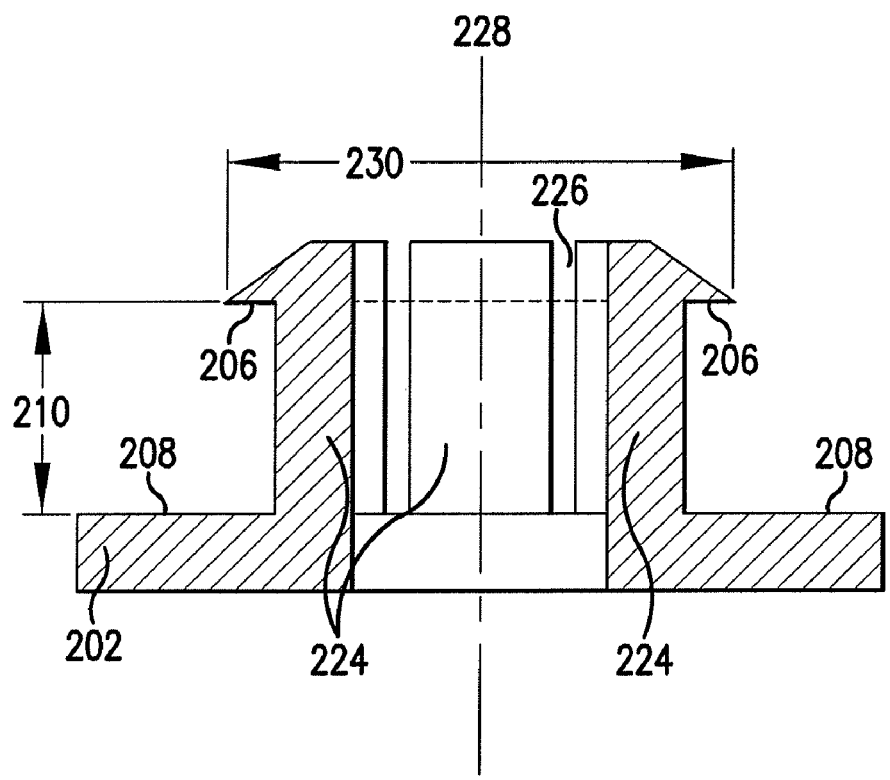
FIG. 4 is a schematic drawing of a first element of a second embodiment of the present invention.

Referring now to FIG. 4, a cross-sectional drawing of an alternative exemplary embodiment of the present invention is shown. In FIG. 4, a cross-sectional view of a first element 202 is shown. In the embodiment shown, the first element 202 is fabricated from aluminum having a coefficient of thermal expansion in the range of approximately 21 to approximately 25 micrometers per degree Celsius per meter using computer numerical controlled machines with the ability to reliably and repeatably generate complex creations in metal with tolerances of less than approximately 25 micrometers. Other materials and methods of fabrication may be used to fabricate first element 202. For instance, the first element 202 could be composed of a polymer, a steel, or any other material with a suitable coefficient of thermal expansion.

In the embodiment shown in FIG. 4, the first element 202 has a series of first protrusions 206, and a second protrusion 208 that comprises a base. Other embodiments may be shaped differently. For example, in one embodiment, there may be only a single first protrusions and there may be a plurality of second protrusions. As shown in FIG. 4, the first protrusions 206 and second protrusion 208 define a space of an initial dimension 210 when the first element 202 is at an initial temperature. In the embodiment shown, the first protrusions 206 are substantially parallel to the second protrusion 208. In alternative embodiments of the present invention, a first protrusion may be adapted differently. For example, a first protrusion may be substantially oblique or perpendicular to a second protrusion of the first element.

In the embodiment shown in FIG. 4, the first protrusions 206 are found at the free end of a plurality of beams 224, each separated from the others by a space 226. In other embodiments, beams fixed at both ends could be used, or no beams at all; also the space 226 could be omitted. In the embodiment shown, the beams 224 and the space 226 alternate in a repeating pattern around a central axis 228 to create a circle of a greatest protrusion diameter 230, creating a protruding collet pin (male) element that relies on mechanical interference, rather than friction, to securely couple with a receiving (female) element. The distance between one point on one of the first protrusions 206 located at the free ends of the beams 224 and the point on the opposite side of the opposing beam 224 creates a protrusion diameter 230.

Figure 5:
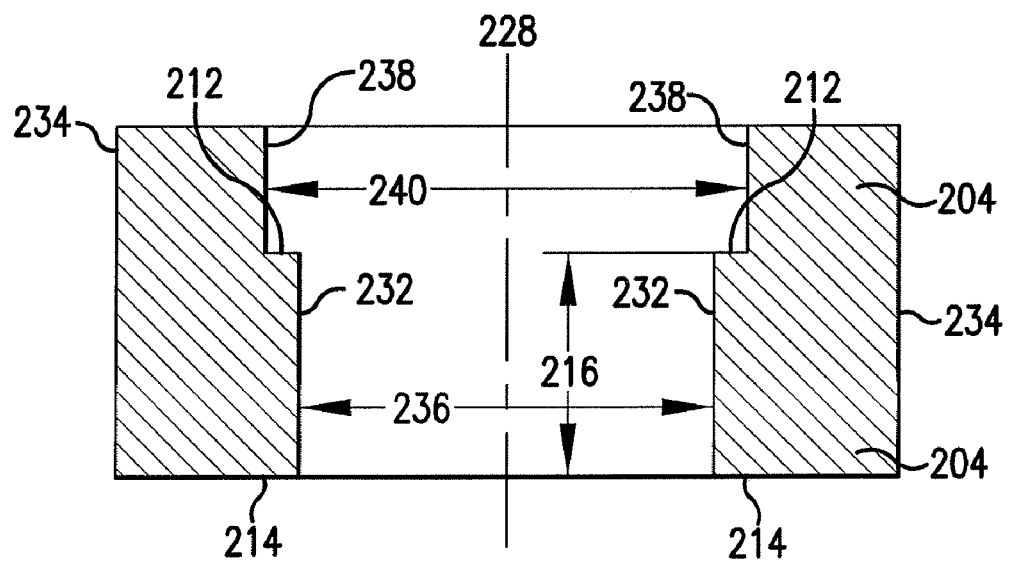
FIG. 5 is a schematic drawing of a second element of the second embodiment of the present invention.

Referring now to FIG. 5, a cross-sectional view of a second element 204 at a second temperature is shown. The second element 204 shown is fabricated from aluminum having a coefficient of thermal expansion in the range of approximately 21 to approximately 25 micrometers per degree Celsius per meter using computer numerical controlled machines with the ability to reliably and repeatably generate complex creations in metal with tolerances of less than approximately 25 micrometers. In other embodiments, other materials and methods of fabrication may be used to fabricate second element 204. For instance, second element 204 could be composed of a polymer, a steel, or any other material with a suitable coefficient of thermal expansion.

In the embodiment shown in FIG. 5, second element 204 comprises a first end 212 adapted for contacting the first protrusions 206 of first element 202. Second element 204 also comprises a second end 214 adapted for contacting the second protrusion 208 of first element 202. First end 212 and second end 214 define a second dimension 216 of greater magnitude than initial dimension 210 of first element 202 as seen in FIG. 4. In the embodiment shown, first end 212 is substantially parallel to second end 214. In alternative embodiments, a first end of a second element may be oriented differently. For example, a first end may be substantially oblique or perpendicular to a second end of the second element.

The second element 204 shown in FIG. 5 comprises a first surface 232 adapted to contact first element 202 when first element 202 and second element 204 are successfully coupled. Second element 204 also comprises a second surface 234. Alternative embodiments of the invention may use second surface 234 to contact first element 202 instead of, or in addition to first surface 232. In the embodiment shown, second element 204 comprises a cylindrical tube arranged about a central axis 228. Second end 214 comprises the base of the tube. Second surface 234 comprises the tube's exterior surface. First surface 232 comprises the tube's inner surface of smallest diameter 236. Alternative embodiments of the invention may use a different shape of second element 204 to couple with first element 202. For example, second element 204 may be shaped as a polygon, an ellipse, or as an irregular shape.

The first end 212 comprises a ledge created between a recessed inner surface 238 of ledge diameter 240 greater than the smallest diameter 236 created by first surface 232. Alternative embodiments of the invention may be created without using a ledge, or using multiple ledges or threads. In the embodiment shown, smallest diameter 236 is smaller than the greatest protrusion diameter 230 of first element 202 as seen in FIG. 4. Accordingly, all beams 224 must deflect towards the same central axis 228 when first element 202 is coupled with second element 204. Alternative embodiments utilizing beams may require beams 224 to deflect away from a central axis 228, or towards or away from a non-central axis.

Figure 6:
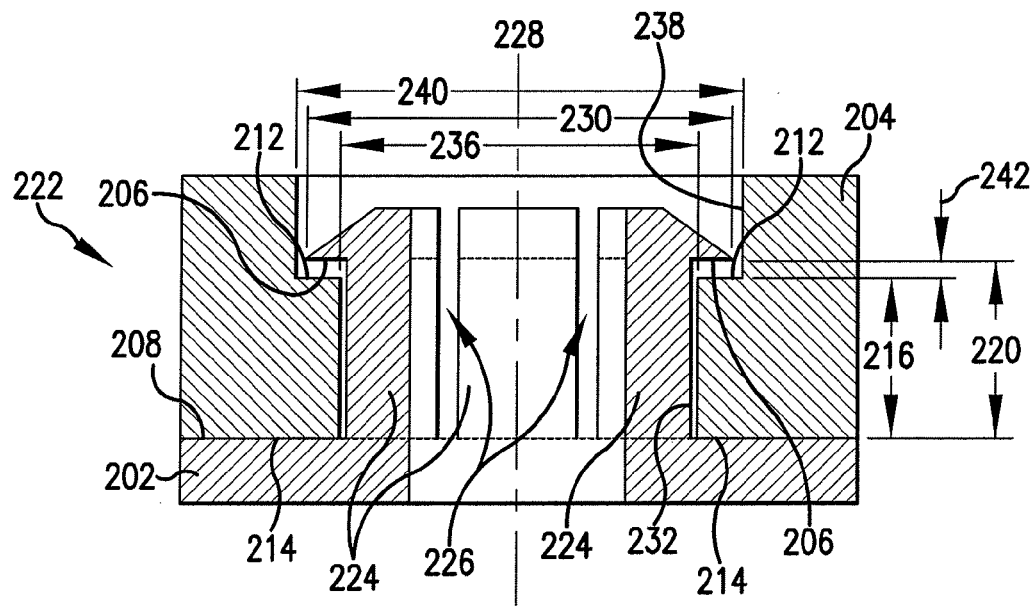
FIG. 6 is a schematic drawing of the first and second elements of the second embodiment of the present invention immediately after coupling.

Referring now to FIG. 6, first element 202 and second element 204 from FIGS. 4 and 5, respectively, are shown being coupled to create an assembly 222. In the embodiment shown, when coupled, first element 202 and second element 204 are arranged about the same central axis 228. Prior to coupling with second element 204, first element 202 has been heated using an external heat source to an elevated first temperature. Any suitable heat source may be used. In the embodiment shown, the heat source comprises a container of boiling water. Alternative embodiments of the invention may use torch heating, induction heating, radiative heating, a heating pad, or a remote heating device, or series thereof, which could be controlled by a computer or manually. In the embodiment shown, as a result of the temperature increase of first element 202, former initial dimension 210 has increased to new first dimension 220. First dimension 220 is greater than second dimension 216 to permit coupling of first element 202 and second element 204 to create assembly 222.

In the embodiment shown, the protrusion diameter 230 is lesser than ledge diameter 240, while still being greater than smallest diameter 236, requiring all beams 224 to deflect towards central axis 228, using the clearance provided by space 226. Alternative embodiments of the present invention may use an alternative design. For example, beams 224 may be required to deflect away from central axis 228 in order for first element 202 and second element 204 to couple to create assembly 222. As shown in FIG. 6, first protrusions 206 do not contact the first end 212 in the present embodiment, leaving a clearance 242. As first element 202 cools to a third temperature lesser than the first temperature, clearance 242 will disappear. In the embodiment shown, first protrusions 206 are substantially parallel to first end 212. In alternative embodiments, a first protrusion of a first element may be oriented differently with respect to first end 212. For example, a first protrusion may be substantially oblique to a first end of a second element.

Figure 7:
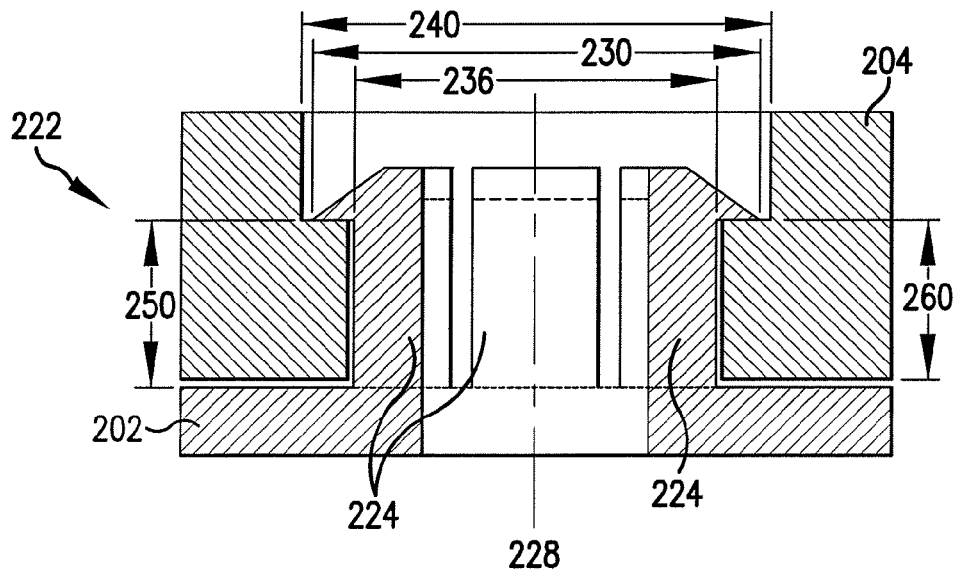
FIG. 7 is a schematic drawing of the coupled first and second elements of the second embodiment of the present invention after part 202 has cooled to a third temperature.

Referring now to FIG. 7, assembly 222 is shown after first element 202 has cooled to a third temperature. The third temperature is lower than the first temperature. First dimension 220 has decreased to a third dimension 250. In the embodiment shown, the first temperature of the first element has changed to the third temperature as a result of exposure to 72 degree Fahrenheit air for an extended period of time. In other embodiments the first temperature may be changed to the third temperature by other suitable methods. The second element 204 has changed to a fourth temperature. The second element 204 comprises a fourth dimension 260 at the fourth temperature. In the embodiment shown, the fourth temperature is substantially equal to both the second and third temperatures. In other embodiments, the fourth temperature is substantially unequal to the second and third temperatures.

The fourth dimension 260 is substantially equal to the third dimension 250. First protrusions 206 contact first end 212 and second protrusion 208 contacts second end 214. Clearance 242 has been eliminated, and both first protrusions 206 and first end 212 have been deformed. The assembly 222 is thereby in a preloaded and interlocked condition. In the embodiment shown, there is no clearance or play between first element 202 and second element 204. Alternative embodiments of the present invention may result in deformation of the second protrusion 208 and the second end 214, or may not comprise deformation of any element, instead maintaining a clearance between the first and second elements 202, 204. In the embodiment shown, the preloaded and interlocked condition in assembly 222 creates a rigid coupling. There is no slip, play or clearance between the first element 202 and the second element 204. The yield strength of the assembly 222 is limited by the plastic yield load of the materials the first element 202 and the second element 204 are fashioned from, rather than by friction. As such, the holding power of such an assembly 222 is limited by material strength rather than by friction between the first and second elements 202, 204.

Figure 8:
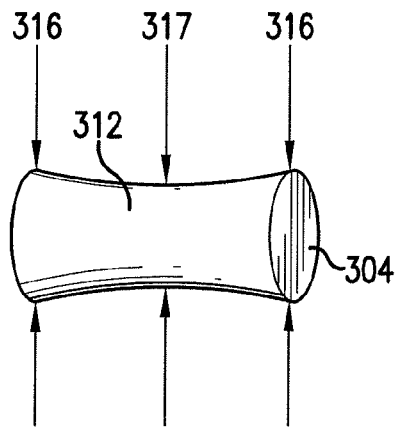
FIG. 8 is a schematic drawing of a second element of a third embodiment of the present invention.

Referring now to FIG. 8, an alternative embodiment of the present invention is shown. A second element 304 comprises a concave cylinder. The cylinder comprises an outer surface 312. The largest diameter 316 and smallest diameter 317 of second element 304 are shown. Smallest diameter 317 is lesser than largest diameter 316.

Figure 9:
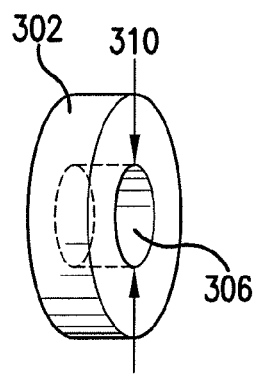
FIG. 9 is a schematic drawing of a first element of the third embodiment of the present invention at an initial temperature.

Referring now to FIG. 9, a first element 302 is shown. In the embodiment shown, the first element 302 comprises a cylindrical tube. The first element 302 comprises an inner surface 306 and an initial inner diameter 310. The initial inner diameter 310 is smaller than both the largest diameter 316 and the smallest diameter 317 as shown in FIG. 8.

Figure 10:
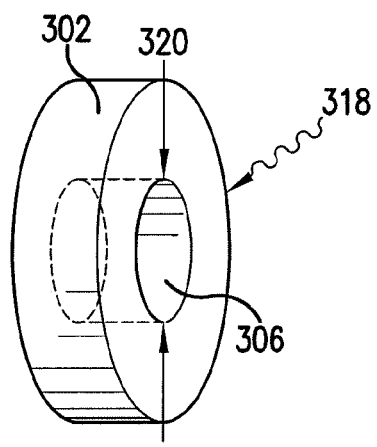
FIG. 10 is a schematic drawing of the first element of the third embodiment at an elevated first temperature.

Referring now to FIG. 10, the first element 302 is shown after being heated to an elevated first temperature. In this embodiment, the first element 302 is heated using a heat source 318. As the first element 302 experienced a rise in temperature, former initial inner diameter 310 increases as a function of the first element 302's coefficient of thermal expansion to a first inner diameter 320. The first inner diameter 320 is greater than both the largest diameter 316 and the smallest diameter 317 as shown in FIG. 8. In alternative embodiments of the present invention, the first inner diameter 320 is greater than the largest diameter 316 but smaller than the smallest diameter 317.

Figure 11:
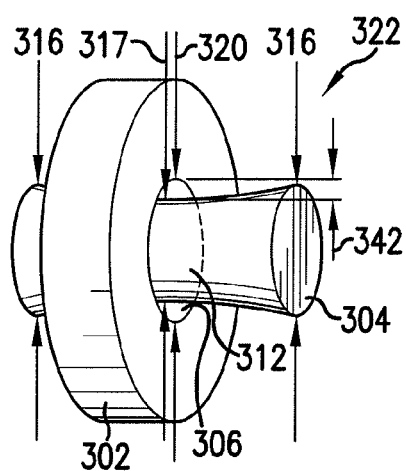
FIG. 11 is a schematic drawing of the first and second elements of the third embodiment of the present invention immediately after coupling.

Referring now to FIG. 11, an assembly 322 is shown. The assembly 322 is created by passing second element 304 through the first inner diameter 320, thereby coupling the elements. In an alternative embodiment, the first element 302 is passed over the second element 304. In the embodiment shown, the first inner diameter 320 is larger than the smallest diameter 317, leaving a clearance 342. The clearance 342 surrounds the entire circumference of the second element's 304 outer surface 312.

Figure 12:
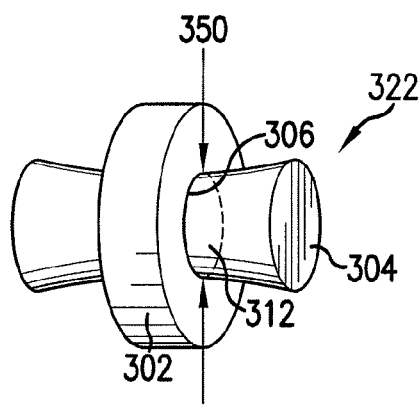
FIG. 12 is a schematic drawing of the coupled first and second elements of the third embodiment of the present invention after part 302 has cooled to a third temperature.

Referring now to FIG. 12, the assembly 322 is shown after the first element 302 has cooled to a third temperature. The third temperature is cooler than the first temperature. As the first element 302 cools to the third temperature, the first inner diameter 320 decreases as a function of the first element's 302 coefficient of thermal expansion to a third inner diameter 350. The second temperature has changed to a fourth temperature. The second element 304 comprises a fourth diameter at the fourth temperature. The fourth diameter is substantially equal to the third inner diameter 350, preloading and interlocking the assembly.

In the embodiment shown, once the first element 302 has reached the third temperature, the inner surface 306 contacts the outer surface 312 substantially throughout the entire circumference of the second element 304. In the embodiment shown, the clearance 342 is eliminated after the first element 302 has cooled to the third temperature. The first element 302 and the second element 304 experience deformation caused by the cooling of the first element 302 to the third temperature. The assembly 322 is thereby preloaded and interlocked. In the embodiment shown, there is no clearance or play in the axial direction between first element 302 and second element 304.

In FIGS. 13-17, another embodiment of the present invention is shown. FIG. 13 shows a second element 404. The second element 404 comprises a generally cylindrical axle. The second element 404 further comprises an outer surface 412. The second element 404 shown comprises a first diameter 416, and a second diameter 417. The second diameter 417 is lesser than the first diameter 416. The portion of the second element 404 that comprises the second diameter 417 is disposed between two portions of the second element 404 comprising the first diameter 416. The second element 404 steps down from the first diameter 416 to the second diameter 417, and then steps back up to the first diameter 416. In another embodiment, the second element 404 comprises chamfered edges between the portion of the second element 404 comprising the second diameter 417 and the portions comprising the first diameter 416.

Referring now to FIG. 14, a first element 402 is shown. The first element 420 shown is at an initial temperature. The first element 402 shown comprises a tube. The first element 402 comprises an inner surface 406. The inner surface 406 comprises an inner diameter 410. The inner diameter 410 shown in FIG. 14 is smaller than either the first diameter 416 or the second diameter 417 of the second element 402 shown in FIG. 13.

FIG. 15 shows the first element 402 after it has been heated to an elevated first temperature. The first temperature is greater than the initial temperature. The first element 402 is heated using a heat source 418, such as an oven. As the first element 402 experiences a rise in temperature, inner diameter 410 grows to a first inner diameter 420 as a function of the first element's 402 coefficient of thermal expansion. The first inner diameter 420 is larger than the initial inner diameter 410. The first inner diameter 420 is also larger than both the first diameter 416 and the second diameter 417 of the second element 404 as shown in FIG. 13.

As shown in FIG. 16, the first element 402 at the first temperature as shown in FIG. 15 has been coupled with the second element 404. The coupled first and second elements 402, 404 form an assembly 422. In the embodiment shown, the assembly 422 is created by passing the first element 402 at the elevated first temperature over the second element 404, where the second element 404 is adjacent the inner surface 406. The first and second elements 402, 404 are thereby coupled. The first inner diameter 420 of the first element 402 is larger than the second diameter 417 of the second element 404, leaving a clearance 442 between the first and second elements 402, 404 around the circumference of the second element's 404 outer surface 412.

Referring now to FIG. 17, a cross-sectional view of the coupled first and second elements 402, 404 is shown. The first element 402 shown has cooled to a third temperature. The third temperature is cooler than the first temperature. As the first element 402 cools to the third temperature, the first inner diameter 420 as shown in FIGS. 15 and 16 decreases as a function of the first element's 402 coefficient of thermal expansion to a third inner diameter 450. The third inner diameter 450 is lesser than the first inner diameter 420 and the first diameter 416 of the second element 404. In the embodiment shown, the third inner diameter 450 is also lesser than the second diameter 417 of the second element 404, leaving the coupled assembly in a preloaded state. The second element 404 shown comprises a fourth temperature. The second diameter 417 shown in FIGS. 13 and 16 has decreased to a fourth diameter at the fourth temperature. The fourth diameter is substantially equal to the third inner diameter 450.

In the embodiment shown in FIG. 17, once the first element 402 has reached the third temperature, the inner surface 406 contacts the outer surface 412 substantially throughout the entire circumference of the portion of the second element 404 originally comprising the second diameter 417 as shown in FIG. 13. The shrinking of the first element 402 as it cools to the third temperature has eliminated the clearance 442. In the embodiment shown, the first and second elements 402, 404 experience deformation caused by the cooling of the first element 402 to the third temperature. The assembly 422 is thereby preloaded and interlocked. In another embodiment, the third inner diameter 450 is substantially equal to, or greater than, the second diameter 417 of the second element 402 as shown in FIG. 13. In such an embodiment, the first element 402 generally may be free to rotate around the second element 404 when the first and second elements 402, 404 are coupled. The first element 402 would not be free to move substantially in the axial direction of the second element 404 in such an embodiment, as the steps up to the first diameter 416 on either side of the portion of the second element 404 provide mechanical interference, interlocking the first and second elements 402, 404. In the embodiment shown, it is not possible to move the first element 402 in any direction with respect to the second element 404.

The first element 402 shown in FIG. 17 is prevented from moving in the axial direction and is interlocked by mechanical obstruction on either side by the steps up to the first diameter 416 of the second element 404. In one embodiment, in order that the first element 402 fit between the steps of the second element 404, the first element 402 must be narrower in the axial direction than the distance between the steps of the second element 404. In one embodiment, when the first element 402 is heated to the third temperature, its width in the axial direction increases as a function of its coefficient of thermal expansion. In such an embodiment, the distance between the steps of the second element 404 may be greater than the increased width in the axial direction of the first element 402 at the third temperature to facilitate the interlocking of the first and second elements 402, 404. In such an embodiment, as the first element 402 cools to the third temperature, the width of the first element 402 in the axial direction will decrease as a function of the coefficient of thermal expansion. The first and second elements 402, 404 will then be interlocked to form the assembly 422 by the mechanical interference caused by the steps of the second element 404. In such an embodiment, there may be some clearance or play in the axial direction of the assembly 422 if there is no preloading of the first and second elements 402, 404.

Figure 18:
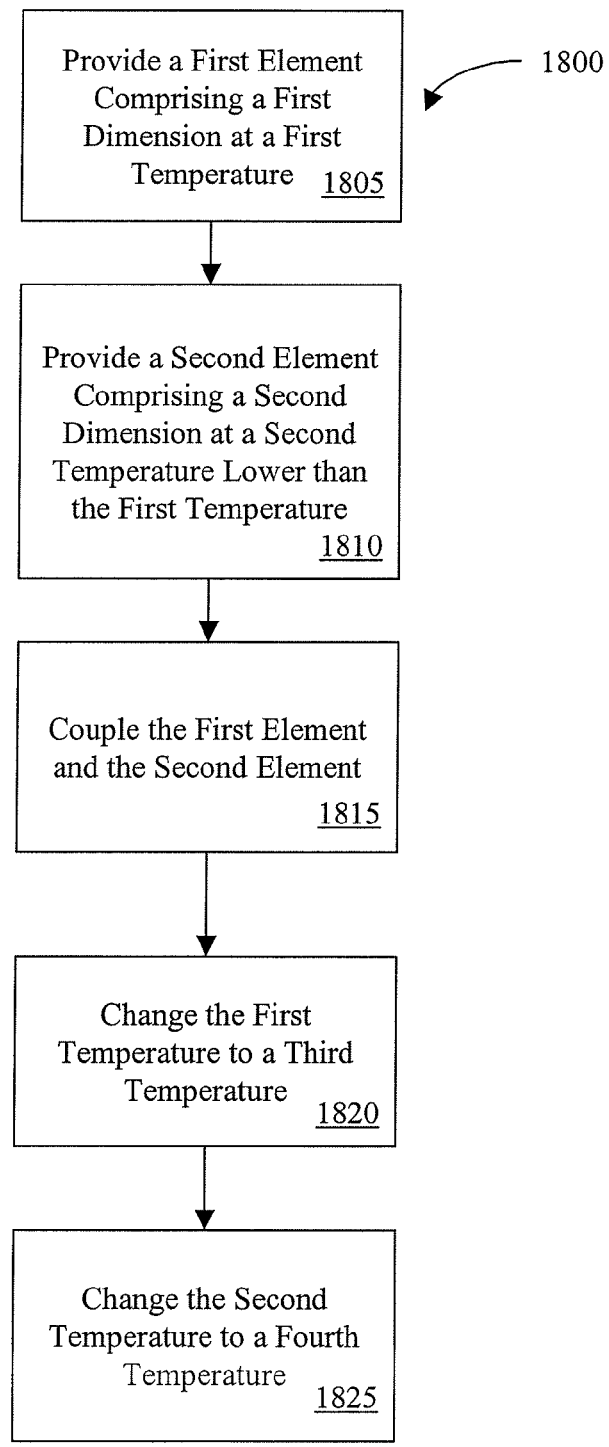
FIG. 18 is a block diagram of a method according to an embodiment of the invention.

Referring now to FIG. 18, a block diagram of a method 1800 according to an embodiment of the invention is shown. FIG. 18 shows an embodiment of a method that may be used to couple elements to create an assembly, as described above. However, the method 1800 may further be used to create alternate assemblies or couplings. The items shown above in FIGS. 1-12, as well as the accompanying description above, are referred to in describing FIG. 18 to aid understanding of the embodiment of the method 1800 shown. However, a user of the method 1800 described is not limited to the embodiments described above and with reference to FIGS. 1-12.

As indicated by block 1805, the method 1800 shown comprises providing a first element comprising a first dimension at a first temperature. In one embodiment, the first element is a collet pin fashioned from aluminum. In this embodiment, the first element is manufactured using a computer numerical controlled machine comprising a tolerance of less than approximately 25 micrometers.

As indicated by block 1810, the method 1800 further comprises providing a second element comprising a second dimension at a second temperature. The second temperature is cooler than the first temperature. The second dimension is lesser than the first dimension. In one embodiment, the second element is a tube fashioned from aluminum of sufficiently large inner diameter to allow coupling with a collet pin first element. The tube is adapted to receive a collet pin. In this embodiment, the second element is manufactured using a computer numerical controlled machine with a tolerance of less than approximately 25 micrometers.

As indicated by block 1815, the method 1800 comprises coupling the first element at the first temperature with the second element at the second temperature to create an assembly.

As indicated by block 1820, the method 1800 comprises changing the first temperature of the first element to a third temperature, the first element comprising a third dimension at the third temperature. The third temperature is cooler than the first temperature. In one embodiment, the first temperature of the first element is cooled to the third temperature by exposing the coupled assembly to 72 degree Fahrenheit air for an extended period of time.

As indicated by block 1825, the method 1800 further comprises changing the second temperature of the second element to a fourth temperature, the second element comprising a fourth dimension at the fourth temperature. The fourth dimension in the embodiment described is substantially equal to the third temperature, thereby preloading and interlocking the assembly. In one embodiment the third and fourth temperatures are substantially equal. In one embodiment, the first and second elements are deformed, preloading and interlocking the assembly.

The foregoing description of the exemplary embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method comprising:
   providing a first element at a first temperature, the first element comprising a first dimension at the first temperature;
   providing a second element at a second temperature, the second temperature lower than the first temperature, the second element comprising a second dimension at the second temperature, the second dimension lesser than the first dimension;
   coupling the first and second elements to create an assembly; and
   changing the first temperature to a third temperature, the first element comprising a third dimension at the third temperature, the third dimension lesser than the first dimension, thereby preloading and interlocking the assembly.

2. The method of claim 1, wherein coupling the first and second elements comprises maintaining substantially the second temperature.

3. The method of claim 2, wherein coupling the first and second elements further comprises maintaining substantially the first temperature.

4. The method of claim 1, further comprising:
changing the second temperature to a fourth temperature, the second element comprising a fourth dimension at the fourth temperature, the third and fourth dimensions substantially equal.

5. The method of claim 4, wherein the third and fourth temperatures are substantially equal.

6. The method of claim 4, wherein the first and third temperatures are substantially equal.

7. The method of claim 1, wherein the first element further comprises a first protrusion and a second protrusion, and
wherein the second element further comprises a first end and a second end, the first protrusion of the first element adapted to contact the first end of the second element, and the second protrusion of the first element adapted to contact the second end of the second element.

8. The method of claim 7, wherein the first dimension of the first element comprises a distance between the first and second protrusions at the first temperature,
the second dimension of the second element comprises a distance between the first end and the second end at the second temperature, and
the third dimension comprises a distance between the first and second protrusions when the first element is changed to the third temperature.

9. The method of claim 1, wherein the first element comprises a metal comprising a coefficient of thermal expansion in a range between approximately 10 micrometers per degree Celsius per meter and approximately 25 micrometers per degree Celsius per meter.

10. The method of claim 1, wherein the first element comprises a polymer comprising a coefficient of thermal expansion in a range between approximately 0 micrometers per degree Celsius per meter and approximately 1000 micrometers per degree Celsius per meter.

11. The method of claim 1, wherein the second element comprises a metal comprising a coefficient of thermal expansion in a range between approximately 10 micrometers per degree Celsius per meter and approximately 25 micrometers per degree Celsius per meter.

12. The method of claim 1, wherein the second element comprises a polymer comprising a coefficient of thermal expansion in a range between approximately 0 micrometers per degree Celsius per meter and approximately 1000 micrometers per degree Celsius per meter.

13. The method of claim 1, wherein the first element comprises a coefficient of thermal expansion different than the second element.

14. The method of claim 1, wherein the second element further comprises an insulating coating adapted to allow differential heating of the first and the second elements.

* * * * *